US012568563B2

(12) United States Patent
Zhang

(10) Patent No.: US 12,568,563 B2
(45) Date of Patent: Mar. 3, 2026

(54) NON-POLAR LIGHT-EMITTING DIODE CONTROL CHIP

(71) Applicant: Guangdong Yongyu Optoelectronics Co., Ltd, Shantou City (CN)

(72) Inventor: Yong-Bing Zhang, Shantou City (CN)

(73) Assignee: GUANGDONG YONGYU OPTOELECTRONICS CO., LTD, Shantou City (CN)

( * ) Notice: Subject to any disclaimer, the term of this patent is extended or adjusted under 35 U.S.C. 154(b) by 97 days.

(21) Appl. No.: 18/678,316

(22) Filed: May 30, 2024

(65) Prior Publication Data

US 2025/0351245 A1 Nov. 13, 2025

(30) Foreign Application Priority Data

May 7, 2024 (CN) ......................... 202410559124.7

(51) Int. Cl.
*H05B 45/375* (2020.01)

(52) U.S. Cl.
CPC .................................. *H05B 45/375* (2020.01)

(58) Field of Classification Search
CPC ....... H05B 45/30; H05B 45/37; H05B 45/375
See application file for complete search history.

(56) References Cited

U.S. PATENT DOCUMENTS

2014/0125240 A1* 5/2014 Bordin ................. H05B 45/375 315/200 R
2021/0298146 A1* 9/2021 Orabi ................. H05B 45/3725

FOREIGN PATENT DOCUMENTS

CN 106102206 A * 11/2016 ............. H05B 45/37
CN 107846759 A * 3/2018 ............. H05B 45/37
CN 108738201 A * 11/2018 ............. H05B 45/10
CN 106851922 B * 12/2018 ............. H05B 45/37

* cited by examiner

*Primary Examiner* — Abdullah A Riyami
*Assistant Examiner* — Syed M Kaiser
(74) *Attorney, Agent, or Firm* — McClure, Qualey & Rodack, LLP

(57) ABSTRACT

A non-polar light-emitting diode control chip includes a package. The package has a first input terminal, a second input terminal, and a control circuit. The control circuit includes a bridge rectifier and a control module. The bridge rectifier is coupled to the first input terminal and the second input terminal and has a first output terminal and a second output terminal. The control module is coupled to the first output terminal and the second output terminal and is configured to output a drive signal.

7 Claims, 6 Drawing Sheets

NON-POLAR LIGHT-EMITTING DIODE CONTROL CHIP

CROSS-REFERENCE TO RELATED APPLICATION

This non-provisional application claims priority under 35 U.S.C. § 119(a) to patent application No. 202410559124.7 filed in China on May 7, 2024, the entire contents of which are hereby incorporated by reference.

BACKGROUND

Technical Field

The present invention relates to a non-polar light-emitting diode control chip, and in particular, to a non-polar light-emitting diode control chip that can adapt to polarity changes of a first input terminal and a second input terminal of a package to drive a light-emitting diode to emit light.

Related Art

A light-emitting diode can be controlled only based on a specific polarity. For example, when polarities of an input terminal and a light-emitting diode of a circuit change, the light-emitting diode cannot emit light. Therefore, a current solution is to connect a plurality of light-emitting diodes with different polarities in parallel in a circuit to respond to a polarity change of an input terminal. However, light-emitting diodes with different polarities need to be added to the circuit. As a result, manufacturing costs cannot be reduced, and the circuit cannot be packaged in one integrated circuit to achieve miniaturization.

SUMMARY

In view of this, in some embodiments, a non-polar light-emitting diode control chip including a package is provided. The package has a first input terminal, a second input terminal, and a control circuit. The control circuit includes a bridge rectifier and a control module. The bridge rectifier is coupled to the first input terminal and the second input terminal and has a first output terminal and a second output terminal. The control module is coupled to the first output terminal and the second output terminal and is configured to output a drive signal.

In some embodiments, the non-polar light-emitting diode control chip further includes a light-emitting diode. The light-emitting diode is configured to receive the drive signal to emit light. The light-emitting diode has a light exit surface, and the light exit surface is exposed out of the package.

In some embodiments, the control circuit further includes a buck circuit connected between the control module and the light-emitting diode.

In some embodiments, the buck circuit includes a first diode, a second diode, and a third diode that are sequentially connected in series, the first diode is coupled to the control module, the second diode is connected in series between the first diode and the third diode, and the third diode is coupled to the light-emitting diode.

In some embodiments, the control module obtains a first regulation voltage when the first diode is switched on, the control module obtains a second regulation voltage when the first diode and the second diode are switched on, and the control module obtains a third regulation voltage when the first diode, the second diode, and the third diode are switched on. The first regulation voltage is less than the second regulation voltage, and the second regulation voltage is less than the third regulation voltage.

In some embodiments, the bridge rectifier has a first conduction path and a second conduction path, and the control module outputs the drive signal when either of the first conduction path and the second conduction paths is switched on.

In some embodiments, a non-polar light-emitting diode control chip including a package is provided. The package has a first input terminal, a second input terminal, and a control circuit. The control circuit includes a first control module, a first current steering element, a second control module, and a second current steering element. The first control module has a first positive input terminal, a first negative input terminal, a first positive output terminal, and a first negative output terminal. The first current steering element has a first P terminal and a first N terminal. The first P terminal is coupled to the first input terminal, the first N terminal is coupled to the first positive input terminal, and the first negative input terminal is coupled to the second input terminal. The second control module has a second positive input terminal, a second negative input terminal, a second positive output terminal, and a second negative output terminal. The second current steering element has a second P terminal and a second N terminal. The second P terminal is coupled to the second input terminal, the second N terminal is coupled to the second positive input terminal, and the second negative input terminal is coupled to the first input terminal.

In some embodiments, the non-polar light-emitting diode control chip further includes a light-emitting diode. One end of the light-emitting diode is coupled to the first positive output terminal and the second positive output terminal, and the other end is coupled to the first negative output terminal and the second negative output terminal. The light-emitting diode has a light exit surface, and the light exit surface is exposed out of the package.

In some embodiments, the first positive input terminal, the first negative input terminal, the first input terminal, and the second input terminal have a first drive input path when the first current steering element is switched on, and the second positive input terminal, the second negative input terminal, the first input terminal, and the second input terminal have a second drive input path when the second current steering element is switched on. The second current steering element is switched off when the first current steering element is switched on.

In some embodiments, when either of the first drive input path and the second drive input path is switched on, the first control module is switched on to output a drive signal in response to switching-on of the first drive input path, and the second control module is switched on to output the drive signal in response to switching-on of the second drive input path.

In some embodiments, the light-emitting diode emits light based on a preset frequency of the drive signal.

To sum up, in some embodiments, a non-polar light-emitting diode control chip including a package is provided. The package includes a control circuit. A bridge rectifier of the control circuit has a first conduction path and a second conduction path. The control circuit may selectively switch on the first conduction path or the second conduction path based on polarities of a first input terminal and a second input terminal in the package, and drive a light-emitting diode through a control module. In some other embodiments, a non-polar light-emitting diode control chip including a package is provided. The package includes a control circuit. The control circuit includes a first control module and a second control module. The control circuit may selectively switch on the first control module or the second control module based on polarities of a first input terminal and a second input terminal in the package, and drive a light-emitting diode. In this way, the control circuit and the light-emitting diode can be packaged together in the non-polar light-emitting diode control chip, and the light-emitting diode can be smoothly driven when the polarities of the first input terminal and the second input terminal change.

The following describes the present invention in detail with reference to accompanying drawings and specific embodiments, but is not intended to limit the present invention.

DETAILED DESCRIPTION

The following describes technical solutions of the present invention in detail with reference to accompanying drawings and specific embodiments to further understand objectives, solutions, and effects of the present invention, but is not intended to limit the protection scope of the appended claims of the present invention.

Figure 1:
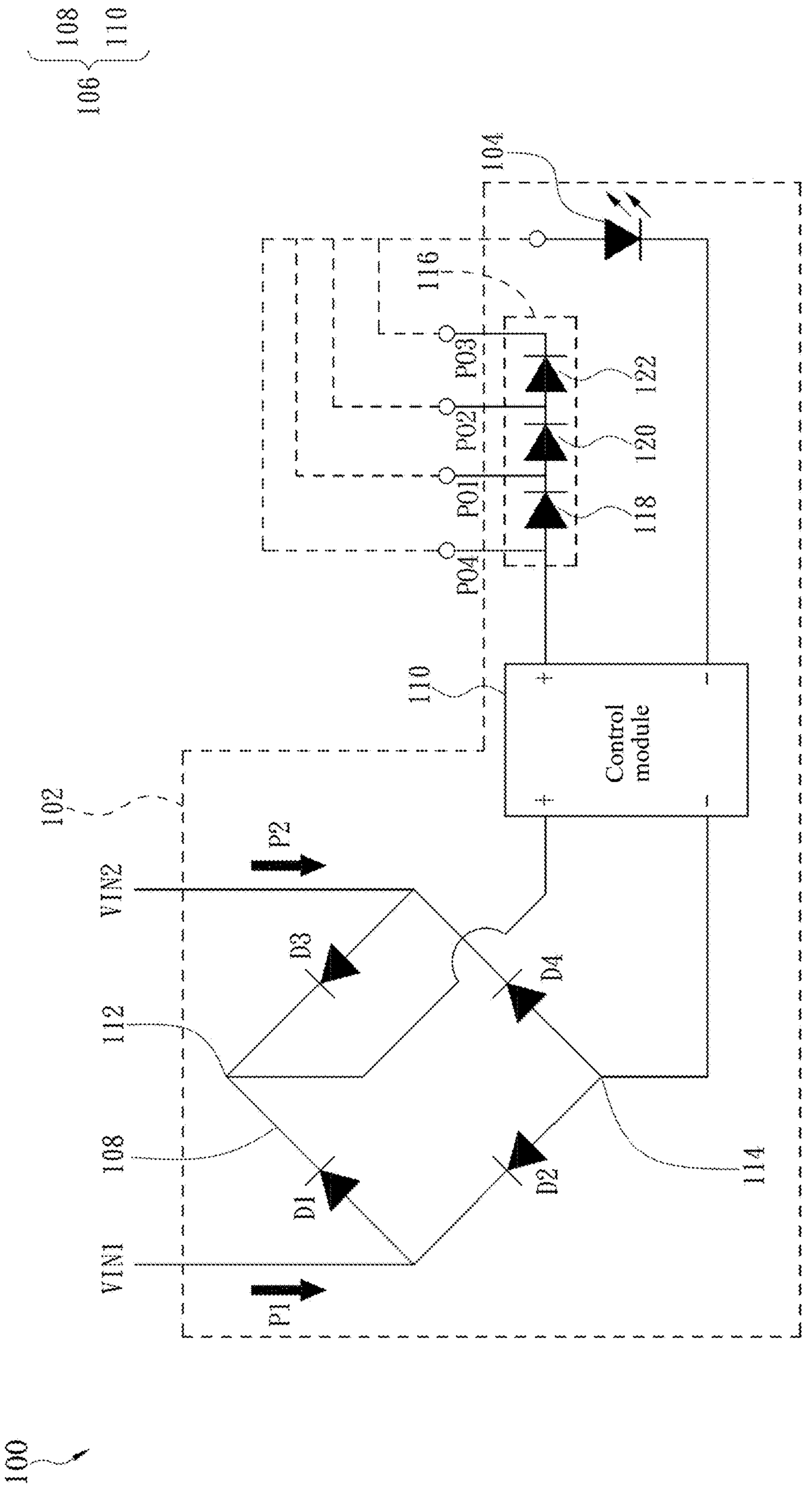
FIG. 1 is a circuit diagram of a non-polar light-emitting diode control chip according to some embodiments of the present invention.

Refer to FIG. 1. FIG. 1 is a circuit diagram of a non-polar light-emitting diode control chip according to some embodiments of the present invention. As shown in FIG. 1, in some embodiments, the non-polar light-emitting diode control chip 100 includes a package 102. The package 102 has a first input terminal VIN1, a second input terminal VIN2, and a control circuit 106. The control circuit 106 includes a bridge rectifier 108 and a control module 110. The bridge rectifier 108 is coupled to the first input terminal VIN1 and the second input terminal VIN2 and has a first output terminal 112 and a second output terminal 114. The control module 110 is coupled to the first output terminal 112 and the second output terminal 114 and is configured to output a drive signal.

The package 102 may be a carrier for packaging the first input terminal VIN1, the second input terminal VIN2, and the control circuit 106 together. It should be noted that the first input terminal VIN1 and the second input terminal VIN2 may receive the drive signal to drive the control circuit 106 and a light-emitting diode (for example, a light-emitting diode 104 below).

That the package 102 has a control circuit 106 (including the bridge rectifier 108 and the control module 110) may mean that both the bridge rectifier 108 and the control module 110 are packaged in the package 102.

The bridge rectifier 108 includes a plurality of diodes (D1, D2, D3, and D4). One end of the diode D1 is coupled to the first input terminal VIN1, and the other end is coupled to the first output terminal 112. One end of the diode D2 is coupled to the first input terminal VIN1 and the diode D1, and the other end is coupled to the second output terminal 114 and the diode D4. One end of the diode D3 is coupled to the first output terminal 112 and the diode D1, and the other end is coupled to the second input terminal VIN2 and the diode D4. One end of the diode D4 is coupled to the second input terminal VIN2 and the diode D3, and the other end is coupled to the second output terminal 114 and the diode D2. The bridge rectifier 108 may receive input power through the first input terminal VIN1 and the second input terminal VIN2, and output the input power to the control module 110 based on polarities of the first input terminal VIN1 and the second input terminal VIN2, so that the control module 110 outputs the drive signal and drives the light-emitting diode (for example, the light-emitting diode 104 below) by using the drive signal.

In some embodiments, the package 102 further includes the light-emitting diode 104. The light-emitting diode 104 is configured to receive the drive signal to emit light. The light-emitting diode 104 has a light exit surface, and the light exit surface is exposed out of the package 102. The light-emitting diode 104 may be a micro light-emitting diode, an organic light-emitting diode (OLED), a quantum dot light-emitting diode (QLED), a mini light-emitting diode (mini LED), or a polymer light-emitting diode (PLED). That the light exit surface of the light-emitting diode 104 is exposed out of the package 102 may mean that the light-emitting diode 104 is packaged in the package 102 and the light exit surface is exposed out of the package 102. When the light-emitting diode 104 is driven, light produced by the light-emitting diode 104 may be transmitted out of the package 102 through the light exit surface.

Figure 2:
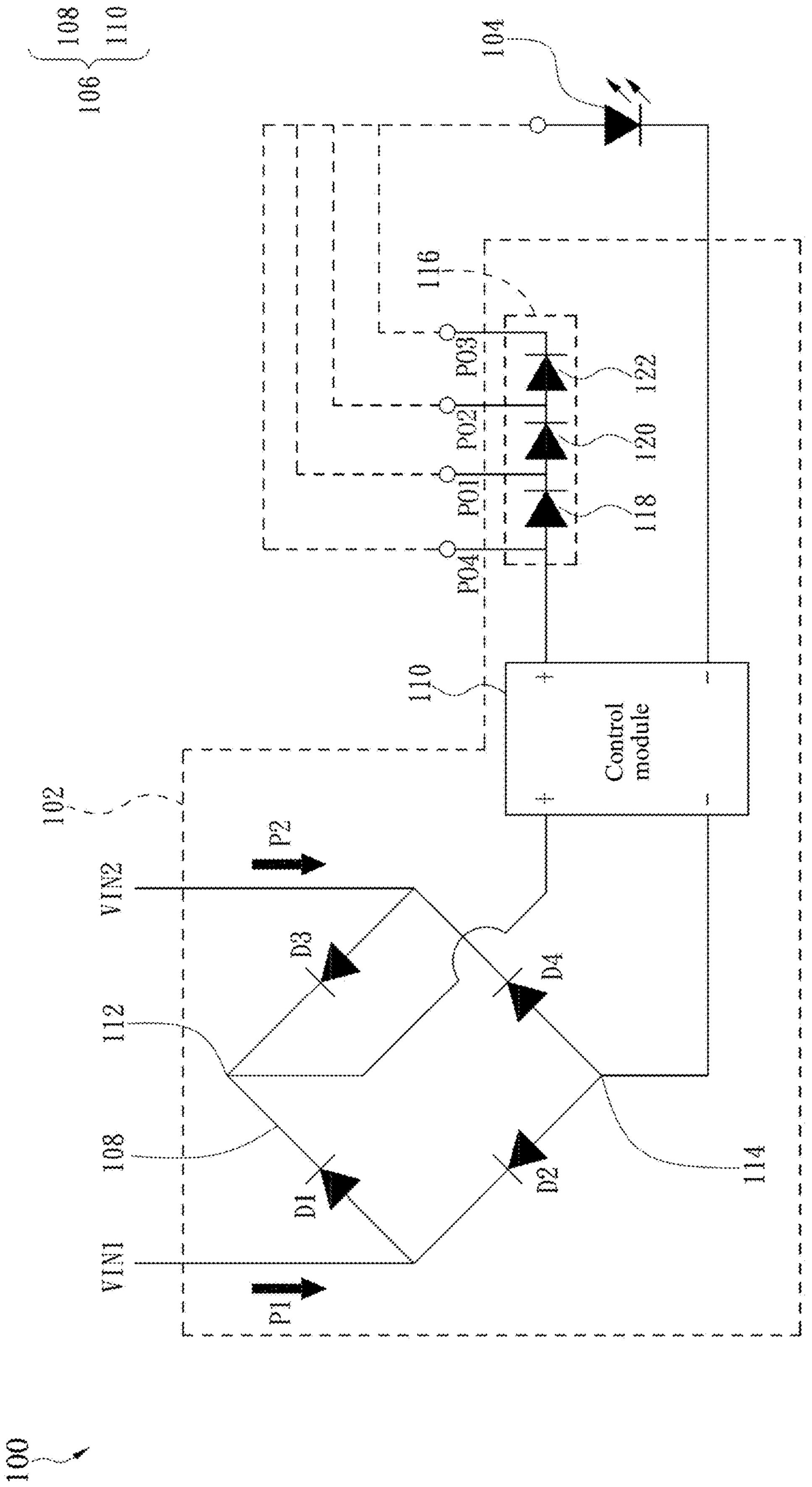
FIG. 2 is a circuit diagram of a non-polar light-emitting diode control chip according to some embodiments of the present invention, where a light-emitting diode is located outside a package.

Refer to FIG. 2. FIG. 2 is a circuit diagram of a non-polar light-emitting diode control chip according to some embodiments of the present invention, where a light-emitting diode is located outside a package. In some embodiments, as shown in FIG. 2, the control module 110 may be connected to the light-emitting diode 104 through a wire, so that the light-emitting diode 104 is disposed outside the package 102. In this way, the package 102 can be coupled to the light-emitting diode 104 disposed outside the package 102 to control the light-emitting diode 104. For example, if a light-emitting diode string (for example, a light-emitting diode string 300 in FIG. 6 below) is configured with the light-emitting diode 104, the control circuit 106 may control the external light-emitting diode 104 after the light-emitting diode 104 is connected to the control module 110 through a wire.

Still refer to FIG. 1 or FIG. 2. In some embodiments, the bridge rectifier 108 has a first conduction path P1 and a second conduction path P2. The control module 110 outputs the drive signal when either of the first conduction path P1 and the second conduction path P2 is switched on. For example, when the first input terminal VIN1 has a high potential and the second input terminal VIN2 has a low potential, the diodes D1 and D4 are switched on to form the first conduction path P1 based on the polarities of the first input terminal VIN1 and the second input terminal VIN2. On the contrary, when the first input terminal VIN1 has a low potential and the second input terminal VIN2 has a high potential, the diodes D2 and D3 are switched on to form the second conduction path P2 based on the polarities of the first input terminal VIN1 and the second input terminal VIN2. On this basis, when the polarities of the first input terminal VIN1 and the second input terminal VIN2 change, the bridge rectifier 108 may correspondingly produce the first conduction path P1 or the second conduction path P2 corresponding to the polarities, so that the light-emitting diode 104 emits light.

Still refer to FIG. 1 or FIG. 2. When the bridge rectifier 108 is switched on, the control module 110 is driven and generates a drive signal to control the light-emitting diode 104 to emit light. The control module 110 may generate, based on a control command, a drive signal corresponding to the control command. The light-emitting diode 104 may produce corresponding light-emitting effect based on the drive signal. For example, a control command may be pre-written to the control module 110, and when the control module 110 is driven, the control module 110 accesses the control command to generate a drive signal. For another example, an electronic communication apparatus may input a control command and send the control command to the control module 110. When the control module 110 is driven, the control module 110 may generate a drive signal based on a received control command. The drive signal may be a pulse width modulation signal, and the light-emitting diode 104 may emit light based on the pulse width modulation signal, so that the light-emitting diode 104 produces a visual effect such as continuous light emitting, blinking, or breathing. For example, the control module 110 may be a circuit combination capable of outputting the drive signal, for example, a central processing unit (CPU), a microcontroller unit (MCU), a digital signal processor (DSP), or an application-specific integrated circuit (ASIC).

Still refer to FIG. 1 or FIG. 2. In some embodiments, the control circuit 106 further includes a buck circuit 116. The buck circuit 116 is connected between the control module 110 and the light-emitting diode 104. It should be noted that the buck circuit 116 selectively produces a regulation voltage. The control module 110 adjusts a drive voltage of the drive signal by using the regulation voltage, to drive the light-emitting diode 104 (the drive voltage is a sum of a voltage of the input power and the regulation voltage).

In some embodiments, the buck circuit 116 includes a first diode 118, a second diode 120, and a third diode 122 that are sequentially connected in series, the first diode 118 is coupled to the control module 110, the second diode 120 is connected in series between the first diode 118 and the third diode 122, and the third diode 122 is coupled to the light-emitting diode 104. In some embodiments, the control module 110 obtains a first regulation voltage when the first diode 118 is switched on, the control module 110 obtains a second regulation voltage when the first diode 118 and the second diode 120 are switched on, and the buck circuit 116 obtains a third regulation voltage when the first diode 118, the second diode 120, and the third diode 122 are switched on. The first regulation voltage is less than the second regulation voltage, and the second regulation voltage is less than the third regulation voltage. For example, a first regulation terminal PO1 exists between the first diode 118 and the second diode 120, a second regulation terminal PO2 exists between the second diode 120 and the third diode 122, and a third regulation terminal PO3 exists at the other end of the third diode 122. The light-emitting diode 104 is selectively coupled to one or a combination of two or more of the first regulation terminal PO1, the second regulation terminal PO2, and the third regulation terminal PO3. For example, the first diode 118 is switched on when the first regulation terminal PO1 is coupled to the light-emitting diode 104, the first diode 118 and the second diode 120 are switched on when the second regulation terminal PO2 is coupled to the light-emitting diode 104, and the first diode 118, the second diode 120, and the third diode 122 are switched on when the third regulation terminal PO3 is coupled to the light-emitting diode 104. In this way, the buck circuit 116 can be connected to the light-emitting diode 104 through the first regulation terminal PO1, the second regulation terminal PO2, and/or the third regulation terminal PO3 to obtain a corresponding regulation voltage. In some embodiments, a fourth regulation terminal PO4 exists between the first diode 118 and the control module 110. When the fourth regulation terminal PO4 is coupled to the control module 110, the first diode 118, the second diode 120, and the third diode 122 are all switched off, so that a regulation voltage is 0 volts. In this way, the non-polar light-emitting diode control chip 100 can adjust, based on a model of the light-emitting diode 104, a drive voltage input to the light-emitting diode 104. In some embodiments, the regulation terminal (PO1, PO2, and/or PO3) may be exposed out of the package 102, and the light-emitting diode 104 is connected to a corresponding regulation terminal (PO1, PO2, and/or PO3) through a wire based on the model of the light-emitting diode 104, so that the light-emitting diode 104 can obtain an appropriate drive voltage. In some embodiments, the regulation terminal (PO1, PO2, and/or PO3) (for example, a regulation terminal (PO1, PO2, and/or PO3) in FIG. 3 below) may alternatively be packaged in the package 102, and the light-emitting diode 104 is pre-connected to a corresponding regulation terminal (PO1, PO2, and/or PO3) based on the model of the light-emitting diode 104, so that the light-emitting diode 104 can obtain an appropriate drive voltage.

Figure 3:
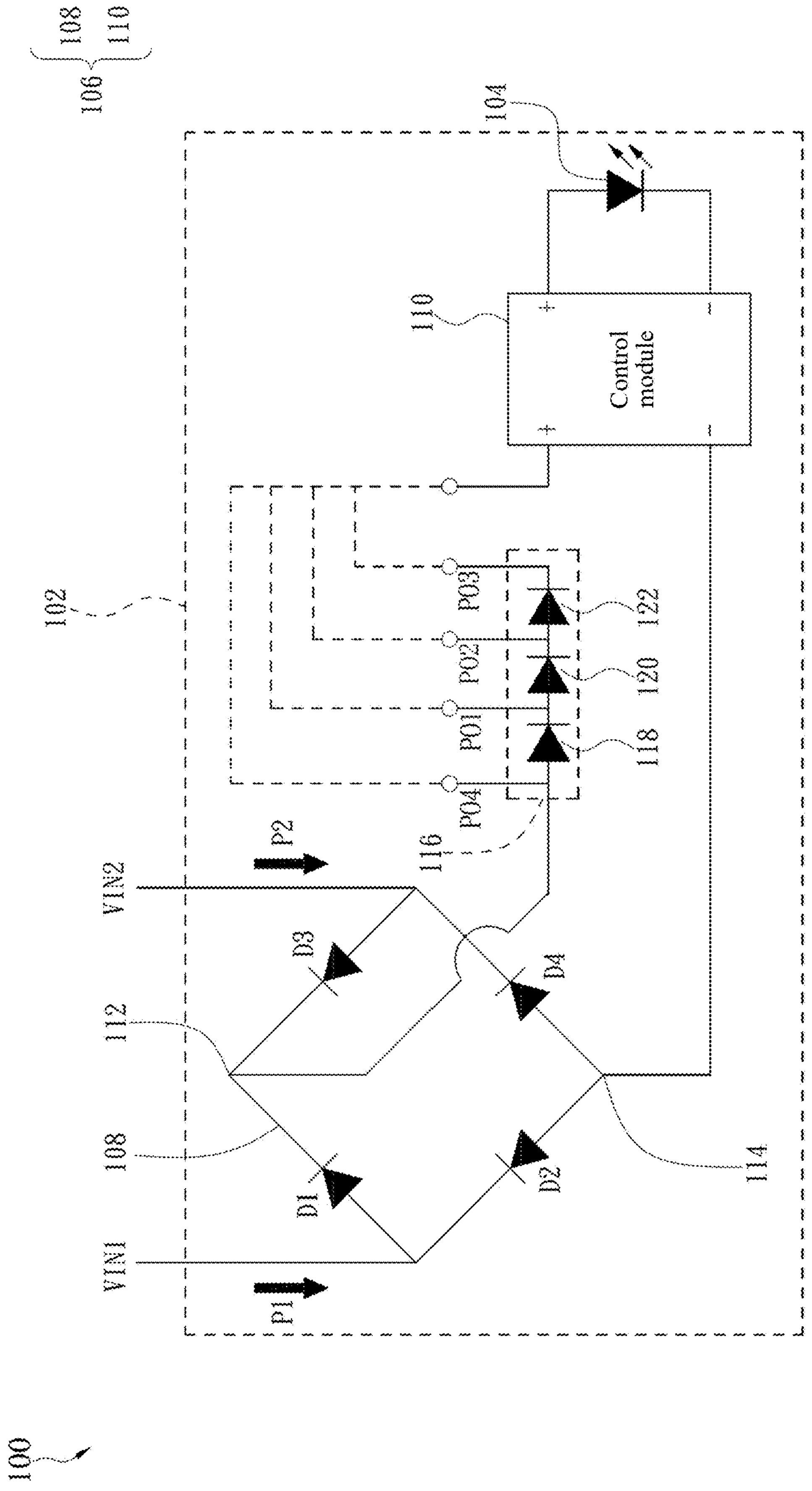
FIG. 3 is a circuit diagram of a non-polar light-emitting diode control chip according to some embodiments of the present invention, where a buck circuit is configured between a bridge rectifier and a control module.

Refer to FIG. 3. FIG. 3 is a circuit diagram of a non-polar light-emitting diode control chip according to some embodiments of the present invention, where a buck circuit is configured between a bridge rectifier and a control module. As shown in FIG. 3, in some embodiments, the buck circuit 116 is connected between the control module 110 and the first output terminal 112. In some embodiments, the first diode 118 is coupled to the first output terminal 112, the second diode 120 is connected in series between the first diode 118 and the third diode 122, and the third diode 122 is coupled to the control module 110. For the buck circuit 116 (the first diode 118, the second diode 120, and the third diode 122), refer to the foregoing descriptions. It should be emphasized that, in this embodiment, the buck circuit 116 is configured in the package 102, and before packaging is performed, a regulation voltage may be determined, and a regulation terminal (PO1, PO2, and/or PO3) corresponding to the regulation voltage is coupled to the control module 110.

Figure 4:
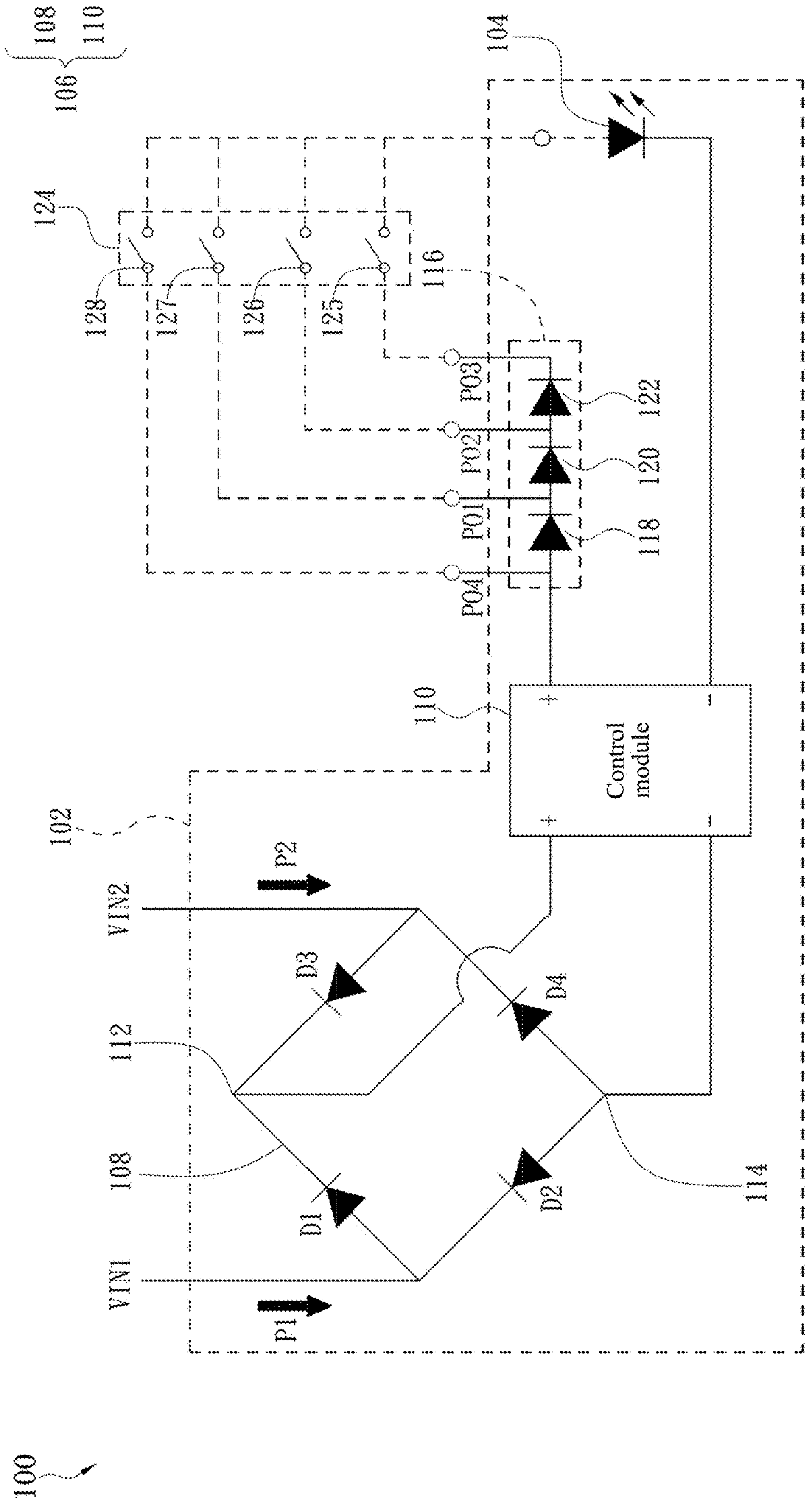
FIG. 4 is a circuit diagram of a non-polar light-emitting diode control chip according to some embodiments of the present invention, where a plurality of switch modules are configured between a buck circuit and a light-emitting diode.

Refer to FIG. 4. FIG. 4 is a circuit diagram of a non-polar light-emitting diode control chip according to some embodiments of the present invention, where a switch module is configured between a buck circuit and a light-emitting diode. As shown in FIG. 4, in some embodiments, the non-polar light-emitting diode control chip 100 further includes a switch module 124. One end of the switch module 124 is coupled to the first diode 118, the second diode 120, and the third diode 122 (namely, the first regulation terminal PO1, the second regulation terminal PO2, the third regulation terminal PO3, and the fourth regulation terminal PO4). The other end of the switch module 124 is coupled to the light-emitting diode 104. The switch module 124 is actuated to selectively switch on the first diode 118, the second diode 120, and the third diode 122. In this way, the non-polar light-emitting diode control chip 100 can change, through the switch module 124, one, two, or more of the first diode 118, the second diode 120, and the third diode 122 that are connected to the light-emitting diode 104.

Still as shown in FIG. 4, in some embodiments, the switch module 124 includes a first switch 125, a second switch 126, and a third switch 127. One end of the first switch 125 is coupled to the third diode 122 (the third regulation terminal PO3), and the other end is coupled to the light-emitting diode 104. One end of the second switch 126 is coupled to the second diode 120 and the third diode 122 (the second regulation terminal PO2), and the other end is coupled to the light-emitting diode 104. One end of the third switch 127 is coupled to the first diode 118 and the second diode 120 (the first regulation terminal PO1), and the other end is coupled to the light-emitting diode 104. The switch module 124 is actuated to selectively switch on one, two, or more of the first switch 125, the second switch 126, and the third switch 127 to obtain the corresponding first regulation voltage, second regulation voltage, and third regulation voltage. For example, when the third switch 127 is switched on and the first switch 125 and the second switch 126 are switched off, the first diode 118 and the light-emitting diode 104 are switched on, and the first regulation voltage is obtained. When the second switch 126 is switched on and the first switch 125 and the third switch 127 are switched off, the first diode 118 and the second diode 120 are switched on, and the second regulation voltage is obtained. When the first switch 125 is switched on and the second switch 126 and the third switch 127 are switched off, the first diode 118, the second diode 120, and the third diode 122 are all switched on, and the third regulation voltage is obtained.

In some embodiments, the switch module 124 further includes a fourth switch 128. One end of the fourth switch 128 is coupled to the control module 110, and the other end is coupled to the light-emitting diode 104. When the fourth switch 128 is switched on, the first diode 118, the second diode 120, and the third diode 122 are all switched off, and a regulation voltage is 0 volts. In some embodiments, for example, the first switch 125, the second switch 126, the third switch 127, and the fourth switch 128 each may be a metal-oxide-semiconductor field-effect transistor (MOSFET).

In some embodiments, for example, the buck circuit 116 in FIG. 3 is configured between the bridge rectifier 108 and the control module 110. One end of the switch module 124 (not shown in FIG. 3) is coupled to the first diode 118, the second diode 120, and the third diode 122 (namely, the first regulation terminal PO1, the second regulation terminal PO2, the third regulation terminal PO3, and the fourth regulation terminal PO4). The other end of the switch module 124 is coupled to the control module 110.

Figure 5:
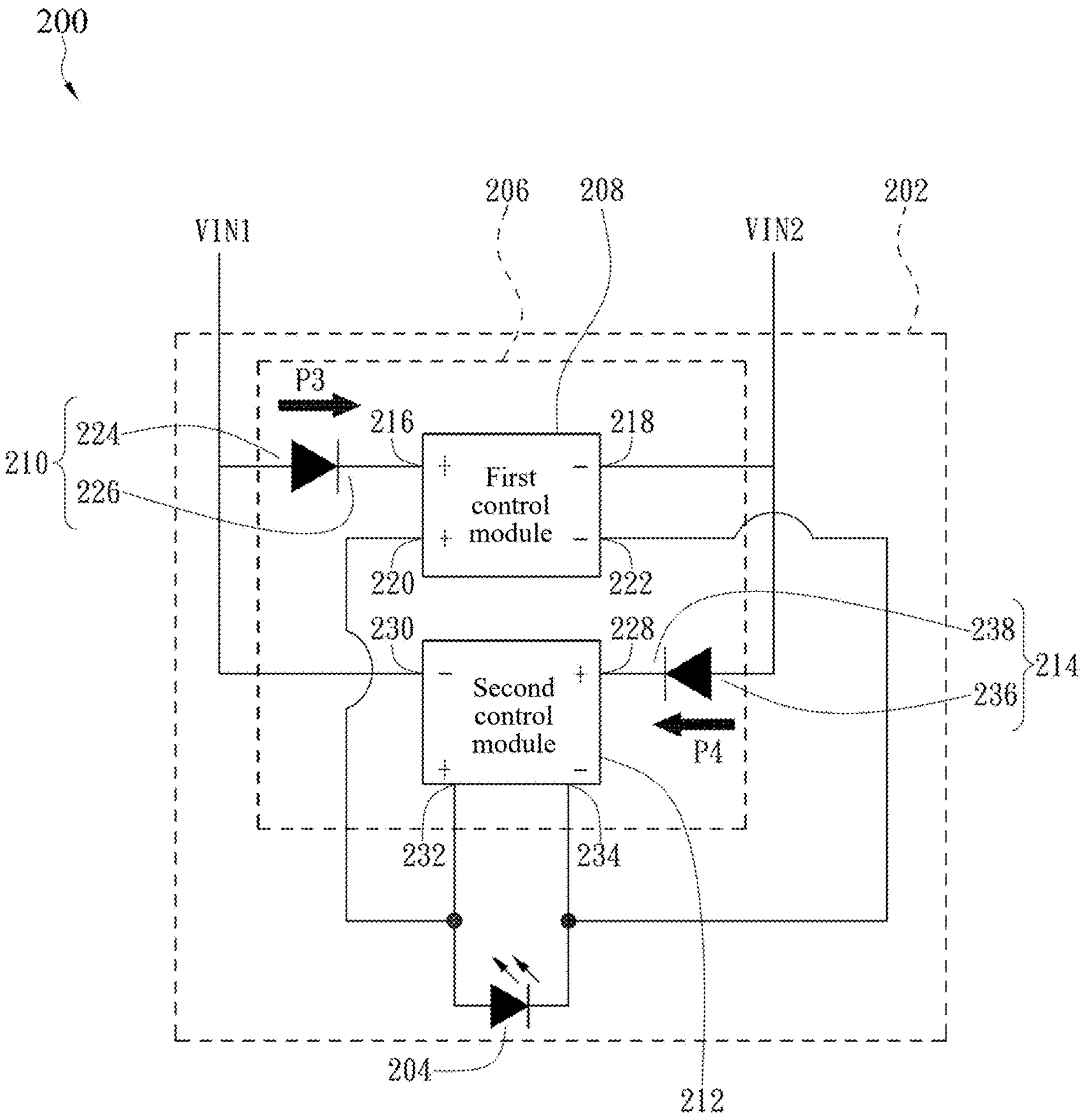
FIG. 5 is a circuit diagram of a non-polar light-emitting diode control chip according to some other embodiments of the present invention.

Refer to FIG. 5. FIG. 5 is a circuit diagram of a non-polar light-emitting diode control chip according to some other embodiments of the present invention. As shown in FIG. 5, in some embodiments, the non-polar light-emitting diode control chip 200 includes a package 202. The package 202 has a first input terminal VIN1, a second input terminal VIN2, and a control circuit 206. The control circuit 206 includes a first control module 208, a first current steering element 210, a second control module 212, and a second current steering element 214. The first control module 208 has a first positive input terminal 216, a first negative input terminal 218, a first positive output terminal 220, and a first negative output terminal 222. The first current steering element 210 has a first P terminal 224 and a first N terminal 226. The first P terminal 224 is coupled to the first input terminal VIN1, the first N terminal 226 is coupled to the first positive input terminal 216, and the first negative input terminal 218 is coupled to the second input terminal VIN2. The second control module 212 has a second positive input terminal 228, a second negative input terminal 230, a second positive output terminal 232, and a second negative output terminal 234. The second current steering element 214 has a second P terminal 236 and a second N terminal 238. The second P terminal 236 is coupled to the second input terminal VIN2, the second N terminal 238 is coupled to the second positive input terminal 228, and the second negative input terminal 230 is coupled to the first input terminal VIN1. The first positive output terminal 220 and the second positive output terminal 232 each are coupled to one end of a light-emitting diode (for example, a light-emitting diode 204 below). The first negative output terminal 222 and the second negative output terminal 234 each are coupled to the other end of the light-emitting diode.

For example, the first control module 208 and the second control module 212 each may be a circuit combination capable of outputting the drive signal, for example, a central processing unit (CPU), a microcontroller unit (MCU), a digital signal processor (DSP), or an application-specific integrated circuit (ASIC). The control circuit 206 may receive input power through the first input terminal VIN1 and the second input terminal VIN2, and selectively actuate, based on polarities of the first input terminal VIN1 and the second input terminal VIN2, either of the first control module 208 and the second control module 212 to output the drive signal to drive the light-emitting diode (for example, the light-emitting diode 204 below). For example, when the first input terminal VIN1 has a high potential and the second input terminal VIN2 has a low potential, the first control module 208 outputs the drive signal based on the polarities of the first input terminal VIN1 and the second input terminal VIN2. On the contrary, when the first input terminal VIN1 has a low potential and the second input terminal VIN2 has a high potential, the second control module 212 outputs the drive signal based on the polarities of the first input terminal VIN1 and the second input terminal VIN2. On this basis, when the polarities of the first input terminal VIN1 and the second input terminal VIN2 change, the control circuit 206 may actuate the corresponding first control module 208 or second control module 212, so that the light-emitting diode emits light.

In some embodiments, the non-polar light-emitting diode control chip 200 further includes the light-emitting diode 204. Two ends of the light-emitting diode 204 are coupled to the first positive output terminal 220 and the first negative output terminal 222 of the first control module 208, and the second positive output terminal 232 and the second negative output terminal 234 of the second control module 212. The light-emitting diode 204 has a light exit surface, and the light exit surface is exposed out of the package 202. The light-emitting diode 204 is the same as the light-emitting diode 104 in FIG. 1, FIG. 2, FIG. 3, or FIG. 4. Refer to the foregoing descriptions of the light-emitting diode 104.

In some embodiments, the light-emitting diode 204 may alternatively be configured outside the package 202 (for example, in FIG. 2, the light-emitting diode 104 is configured outside the package 102). The first positive output terminal 220 and the first negative output terminal 222 of the first control module 208, and the second positive output terminal 232 and the second negative output terminal 234 of the second control module 212 may be connected to two ends of the light-emitting diode 104 through wires, so that the light-emitting diode 204 is disposed outside the package 202. In this way, the package 202 can be coupled to the light-emitting diode 204 disposed outside the package 102 to control the light-emitting diode 204.

Still as shown in FIG. 5, in some embodiments, when the first current steering element 210 is switched on, the first positive input terminal 216, the first negative input terminal 218, the first input terminal VIN1, and the second input terminal VIN2 have a first drive input path P3. When the second current steering element 214 is switched on, the second positive input terminal 228, the second negative input terminal 230, the first input terminal VIN1, and the second input terminal VIN2 have a second drive input path P4. The second current steering element 214 is switched off when the first current steering element 210 is switched on. In this way, the first current steering element 210 can produce the first drive input path P3 when a polarity of the first current steering element 210 matches the polarities of the first input terminal VIN1 and the second input terminal VIN2. At this moment, a polarity of the second current steering element 214 does not match the polarities of the first input terminal VIN1 and the second input terminal VIN2, so that the second current steering element 214 is switched off. On the contrary, the second current steering element 214 can produce the second drive input path P4 when a polarity of the second current steering element 214 matches the polarities of the first input terminal VIN1 and the second input terminal VIN2. At this moment, a polarity of the first current steering element 210 does not match the polarities of the first input terminal VIN1 and the second input terminal VIN2, so that the first current steering element 210 is switched off.

In some embodiments, when either of the first drive input path P3 and the second drive input path P4 is switched on, the first control module 208 is switched on to output the drive signal in response to switching-on of the first drive input path P3, and the second control module 212 is switched on to output the drive signal in response to switching-on of the second drive input path P4. This may mean that the first input terminal VIN1, the second input terminal VIN2, and the first control module 208 are switched on when the first drive input path P3 is switched on, so that the first control module 208 obtains the input power and is driven to output the drive signal; or the first input terminal VIN1, the second input terminal VIN2, and the second control module 212 are switched on when the second drive input path P4 is switched on, so that the second control module 212 obtains the input power and is driven to output the drive signal.

In some embodiments, the light-emitting diode 204 emits light based on a preset frequency of the drive signal. The preset frequency may be predetermined based on a light-emitting mode of the light-emitting diode 204. For example, in a steady-on mode, the light-emitting diode 204 continuously emits light visually. Therefore, the preset frequency may be set to a time within which a light-emitting change is not perceptible to naked eyes (for example, less than $\frac{1}{20}$ seconds). For another example, in a blinking mode, the light-emitting diode 204 blinks visually. Therefore, the preset frequency may be set to be greater than a time within which a light-emitting change is perceptible to naked eyes (for example, greater than $\frac{1}{20}$ seconds).

Figure 6:
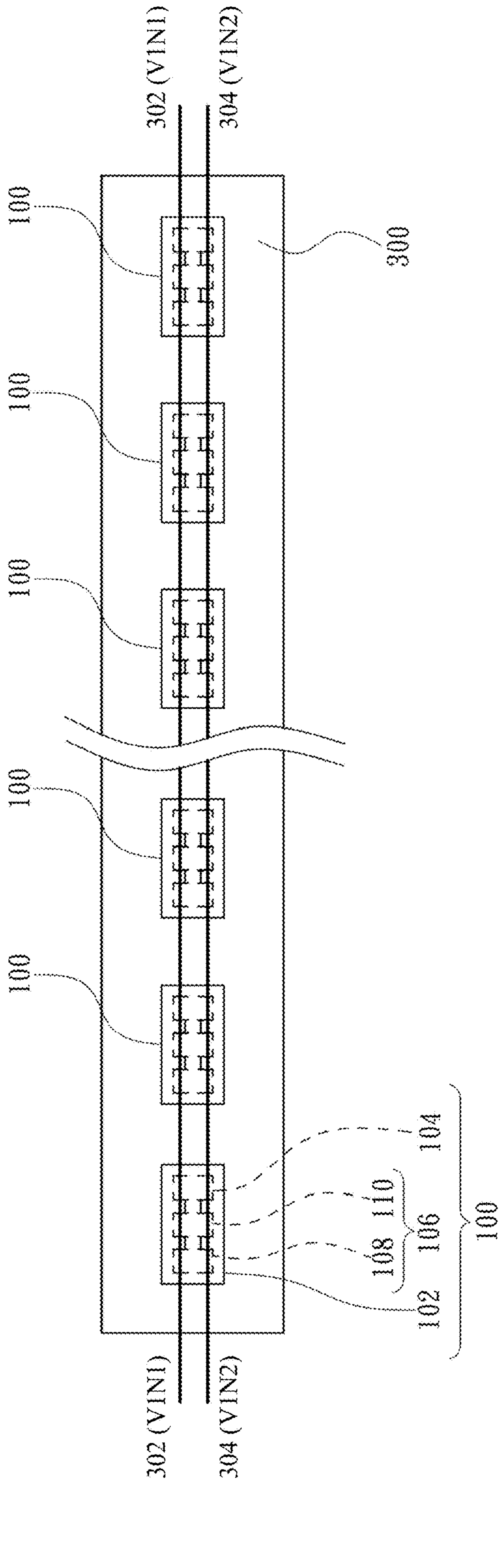
FIG. 6 is a schematic diagram of a non-polar light-emitting diode control chip configured in a light-emitting diode string according to some embodiments of the present invention.

Refer to FIG. 1 and FIG. 6. FIG. 6 is a schematic diagram of a non-polar light-emitting diode control chip configured in a light-emitting diode string according to some embodiments of the present invention. As shown in FIG. 1 and FIG. 6, the non-polar light-emitting diode control chip 100 may be configured in a light-emitting diode string 300. The light-emitting diode string 300 includes a first wire 302 and a second wire 304. The first wire 302 and the second wire 304 may be connected to a power supply. The bridge rectifier 108 is packaged in the package 102, and is coupled to the first wire 302 through the first input terminal VIN1 and coupled to the second wire 304 through the second input terminal VIN2, so that the bridge rectifier 108 can obtain an input voltage through the first input terminal VIN1 and the second input terminal VIN2. In addition, when a polarity of power received by the first wire 302 and the second wire 304 of the light-emitting diode string 300 changes, the bridge rectifier 108 packaged in the package 102 may produce a corresponding first conduction path P1 or second conduction path P2 based on a polarity of the input voltage, so that the control module 110 outputs a drive signal. For a process of driving the light-emitting diode 104 by the control module 110, refer to the foregoing descriptions. It should be noted that the first wire 302 and the second wire 304 are ultra-thin wires, and in the light-emitting diode string 300, a plurality of non-polar light-emitting diode control chips 100 may be electrically connected (for example, welded) to the first wire 302 and the second wire 304 to form the light-emitting diode string 300. Therefore, a width of the light-emitting diode string 300 is slightly greater than a width of the non-polar light-emitting diode control chip 100, so that the width of the light-emitting diode string 300 can be reduced. (A length of the light-emitting diode string 300 may be determined based on a quantity of non-polar light-emitting diode control chips 100 that need to be connected in series and lengths of the first wire 302 and the second wire 304. For example, in FIG. 6, a plurality of non-polar light-emitting diode control chips 100 are continuously welded to the first wire 302 and the second wire 304.)

In some embodiments, in the embodiment of FIG. 6, the non-polar light-emitting diode control chip 100 in the light-emitting diode string 300 may alternatively be replaced with the non-polar light-emitting diode control chip 100 in FIG. 2, FIG. 3, or FIG. 4, or may be replaced with the non-polar light-emitting diode control chip 200 in FIG. 5 (refer to the descriptions of the non-polar light-emitting diode control chip 200 in FIG. 5).

To sum up, in some embodiments, a non-polar light-emitting diode control chip 100 including a package 102 is provided. The package 102 includes a control circuit 106. A bridge rectifier 108 of the control circuit 106 has a first conduction path P1 and a second conduction path P2. The control circuit 106 may selectively switch on the first conduction path P1 or the second conduction path P2 based on polarities of a first input terminal VIN1 and a second input terminal VIN2 in the package 102, and drive a light-emitting diode 104 through a control module 110. In some other embodiments, a non-polar light-emitting diode control chip 200 including a package 202 is provided. The package 202 includes a control circuit 206. The control circuit 206 includes a first control module 208 and a second control module 212. The control circuit 206 may selectively switch on the first control module 208 or the second control module 212 based on polarities of a first input terminal VIN1 and a second input terminal VIN2 in the package, and drive a light-emitting diode 204. In this way, the control circuit (106 or 206) and the light-emitting diode (104 or 204) can be packaged together in the non-polar light-emitting diode control chip (100 or 200), and the light-emitting diode (104 or 204) can be smoothly driven when the polarities of the first input terminal VIN1 and the second input terminal VIN2 change. Alternatively, in the non-polar light-emitting diode control chip (100 or 200), the light-emitting diode (104 or 204) may be configured outside the package (102 or 202) and coupled to the control circuit (106 or 206) through a wire, to control the light-emitting diode (104 or 204) configured outside the package (102 or 202).

Certainly, the present invention may further have a variety of other embodiments. A person skilled in the art may make various corresponding changes and variations according to the present invention without departing from the spirit and essence of the present invention, and all the corresponding changes and variations shall fall within the protection scope of the appended claims of the present invention.

What is claimed is:

1. A non-polar light-emitting diode control chip, comprising:
- a package having a first input terminal, a second input terminal, and a control circuit, wherein the control circuit comprises:
  - a bridge rectifier coupled to the first input terminal and the second input terminal and having a first output terminal and a second output terminal; and
  - a control module coupled to the first output terminal and the second output terminal and configured to output a drive signal;
- wherein the package further comprises a light-emitting diode configured to receive the drive signal to emit light, the light-emitting diode has a light exit surface, and the light exit surface is exposed out of the package;
- wherein the control circuit further comprises a buck circuit connected between the control module and the light-emitting diode, and the buck circuit comprises a first diode, a second diode, and a third diode that are sequentially connected in series, the first diode is coupled to the control module, the second diode is connected in series between the first diode and the third diode, and the third diode is coupled to the light-emitting diode.

2. The non-polar light-emitting diode control chip according to claim 1, wherein the control module obtains a first regulation voltage when the first diode is switched on, the control module obtains a second regulation voltage when the first diode and the second diode are switched on, and the control module obtains a third regulation voltage when the first diode, the second diode, and the third diode are switched on, wherein the first regulation voltage is less than the second regulation voltage, and the second regulation voltage is less than the third regulation voltage.

3. The non-polar light-emitting diode control chip according to claim 1, wherein the bridge rectifier has a first conduction path and a second conduction path, and the control module outputs the drive signal when either of the first conduction path and the second conduction paths is switched on.

4. A non-polar light-emitting diode control chip, comprising:
- a package having a first input terminal, a second input terminal, and a control circuit, wherein the control circuit comprises:
  - a first control module having a first positive input terminal, a first negative input terminal, a first positive output terminal, and a first negative output terminal;
  - a first current steering element having a first (P) terminal and a first (N) terminal, wherein the first (P) terminal is coupled to the first input terminal, the first (N) terminal is coupled to the first positive input terminal, and the first negative input terminal is coupled to the second input terminal;
  - a second control module having a second positive input terminal, a second negative input terminal, a second positive output terminal, and a second negative output terminal; and
  - a second current steering element having a second (P) terminal and a second (N) terminal, wherein the second (P) terminal is coupled to the second input terminal, the second (N) terminal is coupled to the second positive input terminal, and the second negative input terminal is coupled to the first input terminal.

5. The non-polar light-emitting diode control chip according to claim 4, wherein the package comprises a light-emitting diode, one end of the light-emitting diode is coupled to the first positive output terminal and the second positive output terminal, the other end is coupled to the first negative output terminal and the second negative output terminal, the light-emitting diode has a light exit surface, and the light exit surface is exposed out of the package.

6. The non-polar light-emitting diode control chip according to claim 5, wherein the first positive input terminal, the first negative input terminal, the first input terminal, and the second input terminal have a first drive input path when the first current steering element is switched on, and the second positive input terminal, the second negative input terminal, the first input terminal, and the second input terminal have a second drive input path when the second current steering element is switched on, wherein the second current steering element is switched off when the first current steering element is switched on.

7. The non-polar light-emitting diode control chip according to claim 6, wherein when either of the first drive input path and the second drive input path is switched on, the first control module is switched on to output a drive signal in response to switching-on of the first drive input path, and the second control module is switched on to output the drive signal in response to switching-on of the second drive input path.

* * * * *